Sept. 10, 1929.    G. L. ROTHROCK    1,727,787
BRAKE ANCHOR ADJUSTMENT
Filed June 25, 1927

Inventor
George L. Rothrock

By Blackmore, Spencer & Hulse
Attorneys

Patented Sept. 10, 1929.

1,727,787

UNITED STATES PATENT OFFICE.

GEORGE L. ROTHROCK, OF HIGHLAND PARK, MICHIGAN, ASSIGNOR TO GENERAL MOTORS CORPORATION, OF DETROIT, MICHIGAN, A CORPORATION OF DELAWARE.

BRAKE-ANCHOR ADJUSTMENT.

Application filed June 25, 1927. Serial No. 201,422.

My invention relates to brake mechanism for motor driven vehicles, and particularly to brake mechanism of the type wherein braking is effected by expanding a brake band which is housed within a brake drum which rotates with a wheel of the vehicle, the band being carried by a non-rotatable disc which closes the open inner end of the brake drum. The particular embodiment of my invention illustrated shows it in connection with a front wheel brake, although it is equally applicable to a rear wheel brake.

My invention has to do, particularly, with certain structural features of the stationary disc which carries the brake band; with certain features of an abutment made use of to take up rotary thrust of the band when the brake is applied; with certain arrangements of the braking mechanism upon and relative to the stationary disc which carries the same; and to other brake features hereinafter referred to.

The drawing accompanying and forming a part of this specification illustrates the preferred embodiment of my invention; although the same may be embodied in other forms, and I regard my invention as extending to and including such variations and modifications of the particular form thereof illustrated and hereinafter described as come within the scope of the concluding claims, wherein the various features in which my invention consists are particularly pointed out.

Referring now to the drawing.

Figure 1:
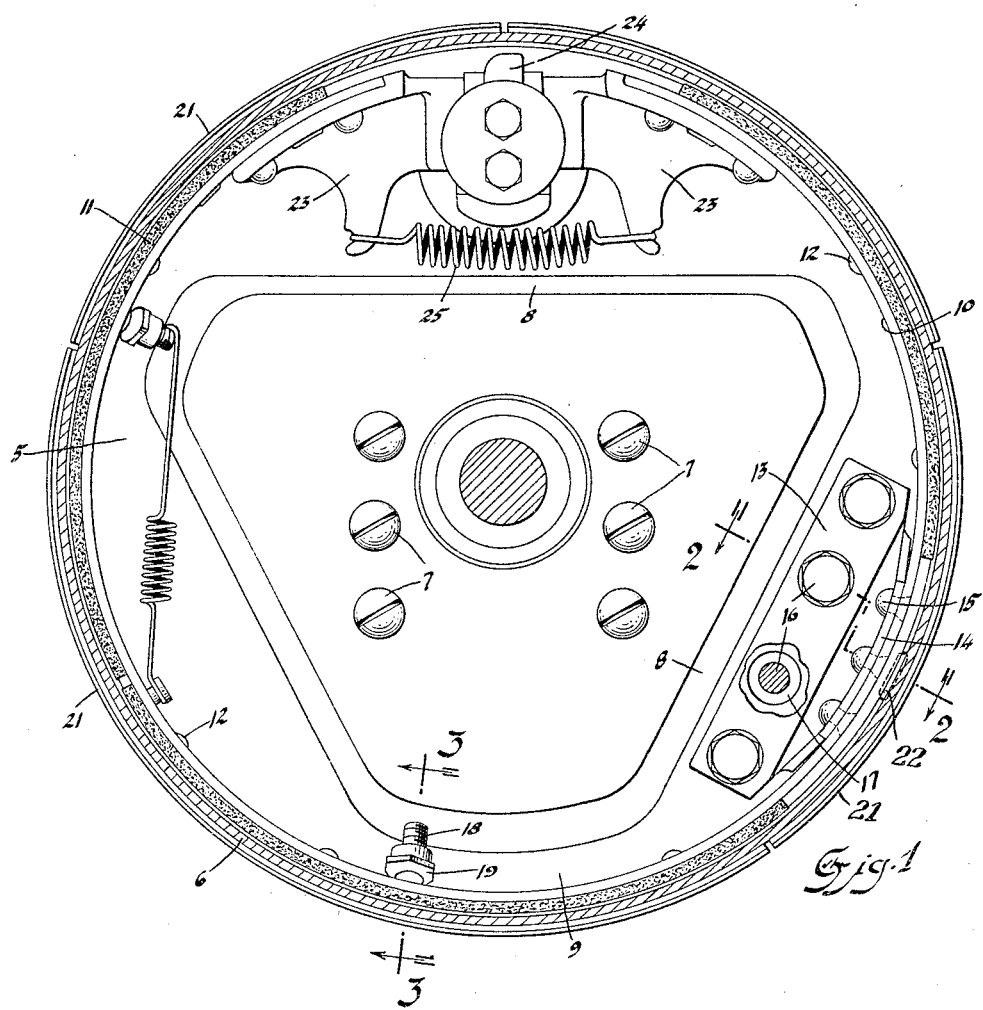
Figure 1 is a view showing my improved brake mechanism in side elevation looking toward the center line of the vehicle; the brake drum, however, being shown in section.

In the drawing, the reference numeral 5 designates a non-rotatable disc circular in form and which serves as a support for the brake band and for the means for expanding the same to apply the brake, and which disc is arranged adjacent and substantially closes the open inner end of the brake drum of the usual form; the drum being fastened to a wheel of the vehicle so as to retard the same when the brake is applied. This disc is fastened to the usual steering knuckle in the case of a front wheel brake, or to the end of the rear axle housing in the case of a rear wheel brake in any suitable way, as by the screws 7 appearing in Figure 1; and the disc is made, preferably, from plate stock shaped as by means of suitable dies so as to provide a central part joined by a wall 8, preferably inclined, to the annular outer portion 9; the periphery of which lies adjacent the free edge of the brake drum. The outer part of the disc as will be seen lies in a plane which is perpendicular to the axis of rotation of the wheel, and the central part is offset from the plane of the outer part outward and toward the closed end of the brake drum.

The central offset part of the disc 5 is shown as triangular in form, although its particular outline is of secondary importance and may be varied. The disc may be otherwise defined as having a central part offset from an outer plane portion thereof which lies in the plane of the open end of the brake drum; the direction of offset being outward and toward the closed end of the drum and the outer wall thereof being parallel to said plane portion.

The reference numeral 10 designates a brake band which lies inside and close to the cylindrical periphery of the brake drum, and which is provided with three pieces of brake lining 11, made of asbestos for the most part, or of any of the friction materials commonly used upon brake bands. This friction material although shown as in three parts may if desired be made in a single piece; and the lining is fastened to the metallic brake band by rivets 12 as is usual in brake mechanism.

The brake band 10 is of the type wherein the tendency of the same to rotate with the drum during braking is prevented by an abutment carried by the disc 5 and which is stationary, therefore, relative to rotary movement of the drum, the abutment being arranged between the ends of the band and, in the particular mechanism herein, nearer one end of the band than the other; so that greater braking effect may be called into play to arrest forward movement of the vehicle than to arrest rearward movement thereof. The abutment, however, may be and often is located at the center of the brake band.

Figure 2:
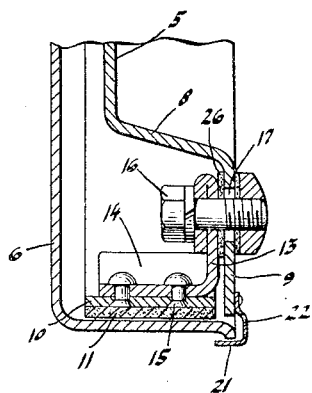
Figure 2 is a fragmentary view upon a transverse plane indicated by the line 2—2, Figure 1.

The abutment just mentioned is shown as right angular in form and is preferably made from sheet metal, and has a flat base portion 13 made up of two thicknesses of the metal of the blank from which the abutment is formed, as best shown in Figure 2; and a band engaging portion 14, which is curved to conform with the band 10 and is fastened thereto as by rivets 15. The base part 13 is carried by the outer plane portion of the disc 5 and is secured to the surface thereof, which is inaccessible when the disc is in use. This base part extends along one side of the triangular offset portion of the disc 5 and is fastened thereto by a sufficient number of bolts 16, the shanks of which extend through enlarged holes 17 in the disc. This permits adjustment for different thicknesses of lining material 11 initially, as well as for adjustment later as the fibrous brake material wears; it being obvious that when the bolts are loose the abutment may be moved radially to position the lining 11 so that there will be any predetermined clearance between it and the interior of the brake drum, and that upon tightening the bolts the parts will be held in the position in which they are placed until the lining becomes worn and readjustment becomes necessary. The abutment, as will be appreciated, is fastened to the surface of the outer part of the disc which is inaccessible when the disc is in use, and the features of construction described permit the adjustment of said abutment from the side of the disc which is exposed when the disc is in use.

Figure 3:
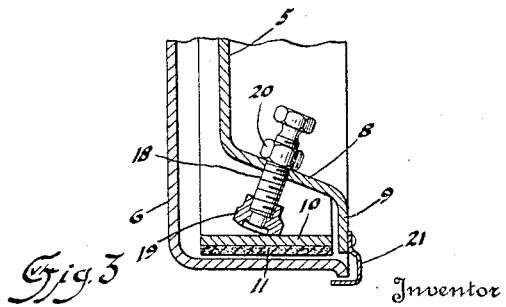
Figure 3 is a similar view upon a plane indicated by the line 3—3, Figure 1.

The clearance between the brake band, or rather the lining carried thereby, and the brake drum at points remote from the abutment is regulated by adjusting members shown as threaded stops 18 extending through the inclined wall 8 of the central triangular offset portion of the disc 5, and which stops are located at two of the three apices of said triangular offset portion; and which stops engage threaded openings in the inclined walls 8 of the disc 5, and which members are preferably provided with enlarged ends 19 which engage the inner surface of the band 10. These ends are shown in Figure 3 as being so formed as to provide flat bearings of considerable area between them and the band so as to reduce wear and maintain the band in its proper position after having been adjusted thereinto. The stops 18 have heads so shaped as to permit them to be turned to adjust the band, and lock nuts 20 are provided for holding them in their adjusted positions; which construction and arrangement permits the said stops to be rotated, and the band to be adjusted from the side of the disc 5 which is exposed when the disc is in use, and without removing the wheel from its driving or knuckle joint axle. The abutment which carries the band 10 will ordinarily need to be adjusted much less frequently than the stops 18; but it will be appreciated that the construction made use of permits it also to be adjusted from the side of the disc 5 which is exposed, and without removing the wheel, by loosening the bolt 16 which hold the abutment to the outer plane portion 9 of the disc 5.

In the brake mechanism shown a dust or mud guard made up of several sections 21 is shown to keep mud from getting into the interior of the brake drum, said sections being fastened to the periphery of the brake supporting disc; and in order that the band may be adjusted without disassembling the brake mechanism a proper number of slots 22 are provided in the guard so that thickness gauges may be inserted through them and between the band and the drum. While the necessity for these slots is the greater adjacent the abutment they may be provided throughout the circumference of the band; and obviously if the dust guard is not used, as is sometimes the case, the band may be adjusted by visual notation of the space between it and the brake drum.

The ends of the band 10 are provided with heads 23 between which an oscillating cam 24 acts to push the ends apart and cause the friction material 11 to engage the inside of the brake drum, when the brake is to be applied, the cam being supported by a suitable bearing member which is carried by the outer plane portion of the disc 5 and arranged adjacent the upper side of the triangular offset portion of the brake disc as illustrated in Fig. 1 of the drawing and the heads are kept in engagement with the cam and the brake in its off position by a spring 25. The details of the brake applying means, however, form no part of the invention to which this present application relates; and so far as the invention herein is concerned any suitable means may be employed to spread the free ends of the brake band to thereby apply the brake.

A sheet of yieldable material 26 is preferably interposed between the base part 13 of the thrust receiving abutment and the surface of the disc to which it is fastened in order to increase the friction between the parts and prevent the abutment from slipping, after it has been properly placed and the bolts 16 tightened to hold the abutment in place.

Having thus described and explained my invention, I claim and desire to secure by Letters Patent:

1. In brake mechanism of the class described and in combination with a brake drum, a non-rotatable brake disc arranged adjacent and extending across the open end of said drum, and the central part of which disc is offset toward the closed end of the drum; a brake band carried by said disc and arranged within said drum; and adjusting stop operable from the side of said disc which is exposed when the disc is in use, and extending therethrough, and the end of which engages said brake band to determine its position relative to the inner surface of said brake drum; and means for expanding said brake band to cause it to engage the inner surface of said brake drum.

2. In brake mechanism of the class described, an integral single piece brake band supporting disc having an outer plane portion circular in outline, a central portion substantially triangular in form and which is offset from the plane of said outer portion, and an inclined wall connecting said two portions with one another; and an abutment carried by the outer plane portion of said disc and arranged adjacent one side of the triangular offset portion thereof, for preventing rotary movement of a brake band carried by said disc.

3. In brake mechanism of the class described, an integral single piece brake band supporting disc having an outer plane portion circular in outline, a central portion substantially triangular in form and which is offset from the plane of said outer portion, and an inclined wall connecting said two portions with one another; brake applying mechanism carried by the outer plane portion of said disc and arranged adjacent one side of the triangular offset portion thereof; and a brake band thrust resisting abutment carried also by the outer plane portion of said disc and arranged adjacent another side of the triangular offset portion thereof.

4. In brake mechanism of the class described, an integral single piece brake band supporting disc having an outer plane portion circular in outline, a central portion which is offset from the plane of said outer portion, and an inclined wall connecting said two portions with one another; and an adjustable stop extending through said inclined wall, said stop being operable from the side of said disc which is exposed when the disc is in use and the end thereof being adapted to engage the inner surface of a brake band carried by said disc.

5. In brake mechanism of the class described, an integral single piece brake band supporting disc having an outer plane portion circular in outline, a central portion subtially triangular in form, and which is offset from the plane of said outer portion, and an inclined wall connecting said two portions with one another; and a threaded stop member extending through a threaded opening in said inclined wall and into a position to engage the inner surface of a brake band carried by said disc, and which member is operable from the inner side of said disc.

6. In brake mechanism of the class described, an integral single piece brake band supporting disc having an outer plane portion circular in outline, a central portion substantially triangular in form, and which is offset from the plane of said outer portion, and an inclined wall connecting said two portions with one another; a brake band thrust absorbing abutment fastened to the outer plane portion of said disc and arranged adjacent one side of the offset triangular portion aforesaid; and two threaded stop members extending through threaded openings in said inclined wall at two apices of the triangular offset portion aforesaid, said stop members being operable from the side of said disc which is exposed when the disc is in use and the ends thereof being adapted to engage the inner surface of a brake band carried by said disc.

7. In brake mechanism of the class described, a brake band supporting disc having an outer plane portion circular in outline, a central portion substantially triangular in form and which is offset from the plane of said outer portion, and an inclined wall connecting said two portions with one another; and two stop members located at two apices of said triangular portion and extending through the wall aforesaid and the inner ends of which are adapted to engage the inner surface of a brake band carried by said disc, and which stop members are adjustable from the side of said disc which is exposed when the disc is in use.

8. In brake mechanism of the class described, a brake band supporting disc having an outer plane portion circular in outline, a central portion substantially triangular in form and which is offset from the plane of said outer portion, and an inclined wall connecting said two portions with one another; brake band expanding means carried by the outer plane portion of said disc and arranged adjacent one of the sides of the triangular offset portion thereof; and a brake band thrust resisting abutment carried also by the outer plane portion of said disc and arranged adjacent another side of the triangular offset portion of said disc.

9. In brake mechanism of the class described and in combination with a non-rotatale brake band supporting disc, an abutment carried by said disc and adapted to receive the thrust of a brake band during braking; means whereby said abutment may be adjusted from the side of said disc which is exposed when the disc is in use and brake applying means carried by said disc.

10. In brake mechanism of the class described and in combination with a non-rotatable brake band supporting disc, a brake band; brake applying means carried by said disc and arranged to force the ends of said brake band apart; an abutment to which said brake band is fastened at a point between the ends of said band; and means operable from the side of said disc which is exposed when the disc is in use for securing said abutment to said disc in various positions.

11. In brake mechanism of the class described and in combination with a non-rotatable brake band supporting disc, an abutment right angular in form secured upon the side of said disc which is inaccessible when the disc is in use; means whereby said abutment may be adjusted from the side of said disc which is exposed when the disc is in use; a brake band fastened to said abutment; and brake applying means carried by said disc and operatively associated with said brake band.

12. In brake mechanism of the class described and in combination with a non-rotatable brake band supporting disc, an abutment right angular in form secured upon the side of said disc which is inaccessible when the disc is in use; means whereby said abutment may be adjusted from the side of said disc which is exposed when the disc is in use; a brake band fastened to said abutment between the ends of said band; and brake applying means carried by said disc and adapted to force the two ends of said brake band apart.

13. In brake mechanism of the class described and in combination with a non-rotatable brake band supporting disc, an abutment right angular in form secured upon the side of said disc which is inaccessible when the disc is in use; bolts extending through enlarged openings in said disc for fastening said abutment thereto; a brake band fastened to said abutment between the ends of said band; and brake applying means carried by said disc and adapted to force the two ends of said brake band apart.

In testimony whereof I affix my signature.

GEORGE L. ROTHROCK.